(12) United States Patent
Meyer et al.

(10) Patent No.: US 9,154,368 B2
(45) Date of Patent: Oct. 6, 2015

(54) METHOD FOR REDUCTION OF DATA PACKET LOSSES ON UPDATING OF AN ADDRESS TABLE

(75) Inventors: Hannes Meyer, Stephanskirchen-Schlossb (DE); Klaus-Peter Schwank, Martinsried (DE); Joachim Seifert, Kirchseeon (DE); Richard Vierthaler, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1250 days.

(21) Appl. No.: 11/885,219

(22) PCT Filed: Dec. 5, 2005

(86) PCT No.: PCT/EP2005/056474
§ 371 (c)(1),
(2), (4) Date: Jun. 10, 2008

(87) PCT Pub. No.: WO2006/092177
PCT Pub. Date: Sep. 8, 2006

(65) Prior Publication Data
US 2008/0247398 A1    Oct. 9, 2008

(30) Foreign Application Priority Data
Feb. 28, 2005  (EP) .................................... 05004272

(51) Int. Cl.
*H04L 12/28* (2006.01)
*H04L 29/12* (2006.01)
*H04L 12/861* (2013.01)

(52) U.S. Cl.
CPC .......... *H04L 29/12009* (2013.01); *H04L 49/90* (2013.01); *H04L 61/00* (2013.01)

(58) Field of Classification Search
USPC .................................................. 370/228–503
See application file for complete search history.

(56) References Cited

U.S. PATENT DOCUMENTS 5,313,582 A * 5/1994 Hendel et al. .................. 710/56
5,784,003 A * 7/1998 Dahlgren ....................... 340/2.2
(Continued)

OTHER PUBLICATIONS

Heike Niedermayer: "Grundlagen•zu Kommunikationsnetzen und Warte-schlangentheorie" Online! 2004, Universität Tübingen, Gefunden im Internet: URL:http://net.informatik.uni-tuebingen.de/teaching/kommnetze/pdf_ws04/GrundlagenUndWarteschlagen.pd, pp. 1-40.

(Continued)

*Primary Examiner* — Nicholas Sloms

(57) ABSTRACT

Reduction of data packet losses on updating of an address table, stored in a computer of a local network is provided. The address table comprises allocations of computer addresses, valid in the local network, to computer addresses valid in the Internet for transmission of data packets, whereby an address allocation stored in the address table is erased after expiry of a validity timer and the address allocation is firstly requested again and inserted in the address table when a data packet is transmitted to an address internet-valid address of a computer in the local network. During the updating of the address allocation, data packets for transmission are buffered in a buffer memory, the size of the buffer memory being configured corresponding to the expected load of the local network. The size of the buffer memory matches the expected load on the local network.

9 Claims, 1 Drawing Sheet

(56) References Cited

U.S. PATENT DOCUMENTS

| | | | |
|---|---|---|---|
| 6,104,696 A * | 8/2000 | Kadambi et al. | 370/218 |
| 6,154,446 A * | 11/2000 | Kadambi et al. | 370/239 |
| 6,335,932 B2 * | 1/2002 | Kadambi et al. | 370/391 |
| 6,335,935 B2 * | 1/2002 | Kadambi et al. | 370/396 |
| 6,430,188 B1 * | 8/2002 | Kadambi et al. | 370/398 |
| 6,560,229 B1 * | 5/2003 | Kadambi et al. | 370/392 |
| 6,643,261 B2 * | 11/2003 | Kadambi et al. | 370/235.1 |
| 6,707,817 B1 * | 3/2004 | Kadambi et al. | 370/390 |
| 6,707,818 B1 * | 3/2004 | Kadambi et al. | 370/391 |
| 6,747,979 B1 * | 6/2004 | Banks et al. | 370/401 |
| 6,795,447 B2 * | 9/2004 | Kadambi et al. | 370/412 |
| 6,804,194 B1 * | 10/2004 | Kadambi et al. | 370/229 |
| 6,810,037 B1 * | 10/2004 | Kalapathy et al. | 370/392 |
| 6,813,268 B1 * | 11/2004 | Kalkunte et al. | 370/392 |
| 6,839,349 B2 * | 1/2005 | Ambe et al. | 370/390 |
| 6,842,457 B1 * | 1/2005 | Malalur | 370/428 |
| 6,850,521 B1 * | 2/2005 | Kadambi et al. | 370/389 |
| 6,859,454 B1 * | 2/2005 | Bowes | 370/366 |
| 6,879,588 B1 * | 4/2005 | Malalur | 370/389 |
| 6,993,027 B1 * | 1/2006 | Kadambi et al. | 370/394 |
| 6,996,099 B1 * | 2/2006 | Kadambi et al. | 370/389 |
| 7,002,982 B1 * | 2/2006 | Herbst | 370/389 |
| 7,020,137 B2 * | 3/2006 | Kadambi et al. | 370/389 |
| 7,031,302 B1 * | 4/2006 | Malalur | 370/357 |
| 7,065,050 B1 * | 6/2006 | Herbst | 370/235 |
| 7,072,335 B1 * | 7/2006 | Kadambi et al. | 370/389 |
| 7,082,133 B1 * | 7/2006 | Lor et al. | 370/392 |
| 7,099,276 B1 * | 8/2006 | Kalkunte et al. | 370/230.1 |
| 7,103,055 B2 * | 9/2006 | Kadambi et al. | 370/409 |
| 7,106,734 B2 * | 9/2006 | Kadambi et al. | 370/389 |
| 7,145,869 B1 * | 12/2006 | Kadambi et al. | 370/229 |
| 7,184,441 B1 * | 2/2007 | Kadambi et al. | 370/400 |
| 7,197,044 B1 * | 3/2007 | Kadambi et al. | 370/418 |
| 7,295,552 B1 * | 11/2007 | Kadambi et al. | 370/392 |
| 7,310,332 B2 * | 12/2007 | Kadambi et al. | 370/360 |
| 7,346,063 B1 * | 3/2008 | Herbst | 370/395.7 |
| 7,366,171 B2 * | 4/2008 | Kadambi et al. | 370/389 |
| 7,366,208 B2 * | 4/2008 | Bowes | 370/535 |
| 7,428,273 B2 * | 9/2008 | Foster | 375/329 |
| 7,480,310 B2 * | 1/2009 | Malalur | 370/428 |
| 7,539,134 B1 * | 5/2009 | Bowes | 370/230 |
| 7,593,403 B2 * | 9/2009 | Kalkunte et al. | 370/392 |
| 7,643,481 B2 * | 1/2010 | Kadambi et al. | 370/389 |
| 7,715,328 B2 * | 5/2010 | Ambe et al. | 370/255 |
| 7,720,055 B2 * | 5/2010 | Kadambi et al. | 370/389 |

OTHER PUBLICATIONS

Nternet Engineering Task Force R Braden et al: "Requirements for Internet Hosts—Communication Layers", IETF Standard, Internet Engineering Task; Force; IETF; CH; Oct. 1989, pp. 1-116.

* cited by examiner

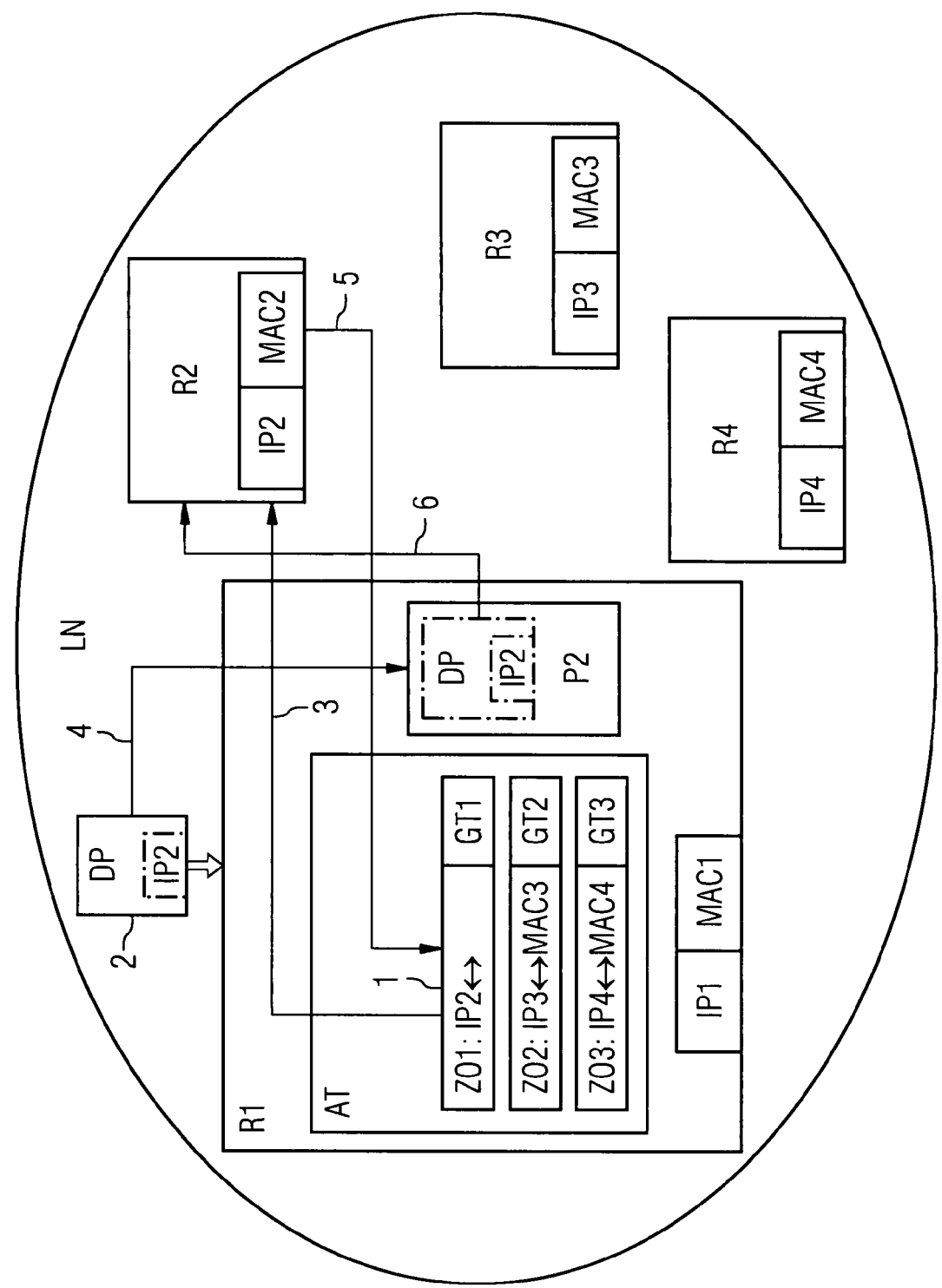

METHOD FOR REDUCTION OF DATA PACKET LOSSES ON UPDATING OF AN ADDRESS TABLE

CROSS REFERENCE TO RELATED APPLICATIONS

This application is the U.S. National Stage of International Application No. PCT/EP2005/056474, filed Dec. 5, 2005 and claims the benefit thereof. The International Application claims the benefits of European application No. 05004272.0 EP filed Feb. 28, 2005, both of the applications are incorporated by reference herein in their entirety.

FIELD OF INVENTION

The invention relates to a method for reduction of data packet losses on updating of an address table which is stored in a computer of a local network and includes assignments of computer addresses applicable in the local network to computer addresses valid in the Internet for sending of data packets, with an assignment stored in the address table being updated after a validity timer has timed out, and with this address assignment only being requested once more and stored in the address table when a data packet is sent again to an address valid in the Internet.

BACKGROUND OF THE INVENTION

A large global but decentralized computer network consisting of many subnetworks is generally referred to as the Internet. Such subnetworks can for example be local networks which are geographically restricted. These local networks are also known as Local Area Networks or LANs and can for example be computer networks of individual companies or institutions.

The Internet Protocol, abbreviated to IP, is used for data transfer in the Internet or transfer from or to the individual subnetworks of the Internet. IP is responsible for the connectionless transport of data in packet form—so-called IP packets—from a computer in a subnetwork to a target computer in a subnetwork via a number of subnetworks. So that an IP data packet can be directed to a specific computer in a subnetwork, addressing of the computers in the subnetworks is undertaken in IP. Each computer is assigned an address which is valid in the Internet, known as its IP address, when it is set up.

The communication process will be further explained with the aid of the OSI reference model, which appears especially useful for describing this process. The OSI reference model comprises 7 layers, with the first layer defining protocols which operate directly on the medium,
the second layer transferring data which is exchanged between two stations, with an error-detection and/or correction protocol,
the third layer handles the transmission of data packets,
the fourth layer looks after the end-to-end connection,
the main task of the fifth layer is the acceptance, the basic execution and the ending of a session from the application layer (also known as layer 7),
the sixth layer interprets the data and ensures the correct syntax and
the seventh layer makes directly distributed data transmission applications available to the user and his programs.

In accordance with the OSI reference model the addressing of a computer is now assigned by the layer 3 IP address. The IP address allows unique addressing of a computer in the Internet or in the subnetwork to which it is assigned. This means that a data packet can be transmitted on the basis of this address valid in the Internet from a sending computer to a target computer, with the two computers being in different subnetworks. The forwarding of the data packets between the subnetworks is undertaken using the IP address. In this case, in accordance with the OSI reference mode data packets received from layer 2 of the OSI reference model which is also called the link layer are transferred, in layer 3, which is also referred to as the network layer. The decision is then made in layer 3 on the basis of the IP address as to the destination of the data packets. In addition to forwarding data packets between various subnetworks, monitoring of the network utilization is also a task of layer 3 of the OSI reference model, which is why the option of buffering data packets is provided in this layer.

Within a subnetwork, especially when this is implemented as a LAN, an additional addressing of the individual computers in the local network is undertaken in layer 2 of the OSI reference model. Layer 2 of the OSI reference model provides an error-free connection between computers as a service within a network. In addition layer 2 also undertakes flow control if data packets cannot be transmitted as quickly as they are being transferred from layer 3 of the OSI reference model. For this flow control a so-called buffer for data packets is provided by layer 2, with a memory of small size for intermediate storage of data packets being referred to as a buffer.

In a LAN, In accordance with the various layers of the OSI reference model, a distinction is made between a hardware address, the so-called Media Access Control or MAC address and the IP address valid in the Internet. Each computer in a local network thus has at least one MAC address and one IP address via which it can be accessed and which are known to the computer. The MAC address, which is unique worldwide if the LAN is based on what is known as Ethernet technology, is used for the transmission of data packets within a local network from a sending computer to a target computer.

In Ethernet technology the data is transported over a shared transmission channel. Access to this transmission channel is undertaken using the collision detection method. This means that each computer which has data to send accesses the shared transmission channel when this channel has been identified by the sending computer as free. The collision-detection method detects and indicates simultaneous access by two computers to the transmission channel. The send process is repeated by the computers after a predetermined time. The data is transmitted in Ethernet technology in what are known as datagrams or frames, of which the length is flexible and into which in frame format the address of the target computer and the address of the sending computer within the local network—i.e. the MAC addresses of the computers are entered.

If a data packet in which the address of the target computer is also packed as an IP address is to be directed to the target computer in a subnetwork realized as a LAN, for the transmission of the data packet the IP address of the target computer must be assigned an address of the target computer which is valid in the local network. For an Ethernet technology-based LAN for example the data packet is packed for transmission into a frame and the MAC address of the target computer is entered into this frame. On the basis of this address valid in the local network the data packet is sent to the target computer.

The address valid in the local network belonging to the IP address of the target computer is requested by the computer which forwards the data packet using a protocol such as the Address Resolution Protocol for example. The Address Resolution Protocol, also abbreviated to ARP, has the task of establishing the formats in which computer addresses are present and of converting these if necessary from one format into the other format.

So that the associated network does not have to be determined for each data packet which is sent to a specific target computer and a local network, the assignments of the computer address valid in the Internet and the local network are stored in an address table. The address assignments in this address table are mostly provided with a timer by which their validity is limited. This means that the address assignments are deleted from the address table after a specific time which is determined by the validity timer timing out. If a further data packet is to be sent to the target computer thereafter for which the address assignment has been deleted from the address table, the assignment between the address of the target computer valid in the Internet and the address valid in the local network must be determined once again and stored once more in the address table.

During the renewed determination of the address assignment however no data packets can be sent to this target computer. A transmission of data packets can only be undertaken after the address assignment has been entered into the address table. With the method known from the prior art data packets which are to be sent during the determination and storage of the address assignment for a target computer are stored for this target computer in the buffer in layer 2 of the OSI reference model.

SUMMARY OF INVENTION

However the problem which occurs in this case is that data packets are lost if this buffer is fully occupied and can therefore not accept any further data packets. The quality of the local network, also referred to as the quality of service, can then no longer be maintained. The occurrence of this packet loss is dependent on a number of factors such as for example the volume of data traffic to the target computer involved at the instant at which the address assignment becomes invalid, and is therefore difficult to calculate.

The underlying object of the invention is thus to specify a method by which reduces this type of data packet losses during determination and storage of the address assignment for a target computer in the address table and maintains the quality of service of the local network.

In accordance with the invention this is done with a method for reduction of data packet losses on updating of an address table which is stored in a main computer of a local network and includes assignments of computer addresses valid in the local network to computer addresses valid in the Internet for sending packets. In this case an address assignment stored in the address table is deleted after a validity timer has timed out and this address assignment is only requested again and entered into the address table when a data packet is again sent to a computer address valid in the Internet, with packets to be sent being offered during the address assignment in a buffer in the local network and the size of this buffer in the local network been configured in accordance with the expected utilization of the network.

The advantage of the inventive method is that the size of the buffer is adapted to the expected utilization of the network. In this way hardly any data packets are lost on account of a full buffer. This results in a reduction of data packet losses during the updating of the address table, and the quality of the local network, also referred to as quality of service, is likewise maintained.

It is advantageous if the size of the buffer in the local network is configured on the basis of the number of expected data packets which are sent to a specific address valid in the Internet. In this way the size of the buffer is matched to the number of data packets which are expected during the updating of the address table for intermediate storage in the buffer. This loss of data packets is thereby reduced and the quality of service of the local network is maintained.

It is also useful here for the size of the buffer in the local network to be configured on the basis of the length of time for the updating of the address assignment in the address table.

This allows account to be taken of the fact that a larger buffer is provided for intermediate storage of data packets for a longer period of updating than for a shorter period. This reduces the loss of data packets, the quality of the local network is maintained and the storage space is occupied in accordance with actual requirements.

It is further advantageous in such cases for the buffer to be designed as a service of layer 2 of the OSI reference model. Since flow control it is also undertaken by this layer of the OSI reference model during data transmission it already provides a memory for buffering. This memory can then be used in a simple way as a configurable buffer for intermediate storage of data packets. This represents a simple-to-implement solution for reducing packet losses.

It is also useful for additional services of layer 3 of the OSI reference model to be used for the buffering of the data packets. Further core storage space is made available for buffering of data packets by this use of layer 3 of the OSI reference model if the buffer memory designed as a service of layer 2 of the OSI reference model threatens to overflow. Thus the use of the services of a layer 3 of the OSI reference model reduces the threat of packet losses.

In a preferred manner Ethernet technology is used for realizing the local network—in particular because Ethernet technology is so widely used in local networks. In the year 2000 the proportion of local networks based on Ethernet technology was estimated as 80%.

It is further advantageous for the Address Resolution Protocol to be used for the determination of the address assignment of the computer address valid in the local network to a computer address valid in the Internet. This is especially because the Address Resolution Protocol can convert computer addresses between different addressing protocols in a simple manner.

BRIEF DESCRIPTION OF THE DRAWINGS

The invention will be explained in greater detail with reference to one FIGURE This shows the typical functional structure of a local network in which the inventive method is employed.

DETAILED DESCRIPTION OF INVENTION

FIG. 1 shows a computer R1 in a local network LN, which for example includes further computers R2, R3, R4. Stored on each of these computers R1, R2, R3, R4 is the address valid in the Internet IP1, IP2, IP3, IP4 as well as the address MAC1, MAC2, MAC3, MAC4 of the respective computer R1, R2, R3, R4 valid in the local network LN.

The connection between the local network LN and the Internet is made via computer R1, which is embodied as a so-called edge router, i.e. this computer R1 is used at the area of the local network LN, where for example terminals or the connection to the Internet are connected, and has the advantage that not all computers R1, R2, R3, R4 of the local network LN must have all possible interfaces available, but only computer R1.

If a data packet DP is now sent from the Internet to a computer R1, R2, R3, R4 of the local network LN it is first routed to the computer R1. If this data packet DP for example is now intended to reach computer R2 in the local network LN, the address IP2 of the computer R2 valid in the Internet supplied by the data packet DP is detected by computer R1 and computer R1 uses the Address Resolution Protocol to request the current address MAC2 of the computer R2 valid in the local network LN. The address MAC2 of the computer R2 valid in the local network LN is returned by the computer R2 to the computer R1, the data packet DP is provided with the address MAC2 and is then sent in the local network LN to the computer R2.

So that the address MAC2 of the computer R2 valid in the local network does not have to be requested again each time for each data packet DP transmitted to the computer R2, an address table AT is configured on the computer R1. Stored in this address table AT are address assignments Z01, Z02, Z03 for the transmission of data packets DP to a computer R2, R3, R4 of the local network LN. Through the address assignment Z01 for example the address IP2 of the computer R2 valid in the Internet is linked to the address MAC2 of the computer R2 valid in the local network LN. To send a data packet DP to computer R2 the address MAC2 of the computer R2 valid in the local network LN is then determined from the address table AT.

For each address assignment Z01, Z02, Z03 there is a validity timer GT1, GT2, GT3 in the address table AT after the timeout of which the address assignment Z01, Z02, Z03 is deleted from the address table AT. If for example the validity timer GT1 has timed out, in a step 1 the address assignment Z01 is deleted from the address table AT.

If in a step 2 a data packet DP arrives from the Internet in the local network LN at computer R1 which, in accordance with the address assignment Z01, is to reach computer R2, in a step 3 the address MAC2 of the computer R2 valid in the local network is requested by means of the Address Resolution Protocol and on the basis of the address IP2 valid in the Internet is requested by computer R1 from computer R2.

in a further step 4 this data packet DP is buffered in a buffer P2 for transmission to the computer R2. The buffer P2 is designed as a service of layer 2 of the OSI reference model and as configurable by a user such as a network operator of the local network LN for example in accordance with the expected utilization, the expected number of data packets DP and/or the period for the updating of the address assignment Z01, Z02, Z03 in the address table AT.

In a step 5 the address MAC2 of computer R2 valid in the local network is returned to computer R1, the updated address assignment Z01 is entered again in the address table AT and the validity timer GT1 is started again. Once the address assignment Z01 has been updated, in a step 6 the data packet DP stored in the buffer P2 is provided with the address MAC2 and sent to the computer R2.

If, because of the updating of a number of address assignments Z01, Z02, Z03 more data packets DP than the expected number of data packets DP are stored in buffer P2, in addition a buffering which is designed as a service of layer 3 of the OSI reference model, is included.

The invention claimed is:

1. A method for reduction of data packet losses on updating an address table, comprising:
   receiving a data packet having an Internet address for a computer for which the data packet is to be sent;
   updating an address table stored in a computer of a local network; the address table updated with an assignment of a computer addresses valid in a local network to the Internet address, the update in response to the address table not having an assignment for the Internet address;
   deleting the address assignment after a validity timer has timed out; and
   storing the data packet to be sent in a buffer during the updating of the address assignment, a size of the buffer configured in accordance with the expected utilization of the local network based on a number of data packets expected to be sent to the Internet address.

2. The method as claimed in claim 1, wherein an. Ethernet technology is used for the implementation of the local network.

3. The method as claimed in claim 1, wherein the buffer is made available via a link layer for flow control during transmission of data packets.

4. The method as claimed in claim 3, further comprising sending the data packet stored in the buffer in response to updating the assignment.

5. The method as claimed in claim 3, wherein in that a network layer, which is above the link layer in a network hierarchy, is additionally used for buffering the data packets.

6. The method as claimed in claim 1, wherein the data packets to be sent are stored in a buffer which is configured based on a period of time required for updating the address assignment in the address table.

7. The method as claimed in claim 6, wherein the buffer is made available via a link layer for flow control during transmission of data packets.

8. The method as claimed in claim 7, wherein in that a network layer, which is above the link layer in a network hierarchy, is additionally used for buffering the data packets.

9. The method as claimed in claim 1, wherein in that the Address Resolution Protocol is used to determine the address assignment of the computer address to the Internet address.

* * * * *